United States Patent [19]

Grondal et al.

[11] Patent Number: 5,428,912

[45] Date of Patent: Jul. 4, 1995

[54] INDIRECTLY ILLUMINATED SIGN

[75] Inventors: Daniel J. Grondal, Bethel; Robert M. Johnstone, Fairfield, both of Conn.

[73] Assignee: Prolume Incorporated, Fairfield, Conn.

[21] Appl. No.: 102,285

[22] Filed: Aug. 5, 1993

[51] Int. Cl.6 .............................................. G09F 13/04
[52] U.S. Cl. ....................................... 40/570; 362/800
[58] Field of Search ................. 40/570, 544, 582, 572; 362/800

[56] References Cited

U.S. PATENT DOCUMENTS

| | | | |
|---|---|---|---|
| 1,524,446 | 1/1925 | Meacher | 40/572 |
| 3,324,290 | 6/1967 | Lasker | 40/470 |
| 5,018,290 | 5/1991 | Kozek et al. | 40/570 |
| 5,105,568 | 4/1992 | Branning | 40/570 |
| 5,136,483 | 8/1992 | Schoniger | 362/800 |
| 5,151,679 | 9/1992 | Dimmick | 362/800 |
| 5,299,109 | 3/1994 | Grondal | 40/570 |

FOREIGN PATENT DOCUMENTS

| | | | |
|---|---|---|---|
| 1105443 | 12/1955 | France | 40/572 |
| 0022990 | of 1913 | United Kingdom | 40/570 |
| 2168519 | 6/1986 | United Kingdom | 40/570 |

Primary Examiner—Edward K. Look
Assistant Examiner—Mark Sgantzos
Attorney, Agent, or Firm—McCormick, Paulding & Huber

[57] ABSTRACT

An internally illuminated sign having indirect illumination provided by light emitting diodes (LED). A plurality of LED's are mounted on a printed circuit board (PC board) and mounted within the sign. The PC board is offset to a side of the sign housing with the somewhat directional LED light source directed toward a reflector. The reflector is angled to convert the generally narrow directional light source of an LED into a substantially even, diffused and non-uniform light distribution pattern.

13 Claims, 3 Drawing Sheets

INDIRECTLY ILLUMINATED SIGN

FIELD OF INVENTION

The present invention relates to illuminated devices and, more particularly, to an LED illuminated sign such as, for example, a so-called exit sign.

BACKGROUND OF INVENTION

Typically, lighted signs such as are utilized for indicating an "exit", or "fire escape" and the like, generally include a transparent or translucent colored lens or cover screen interposed in front of at least one florescent or incandescent bulb. Such devices, however, require relatively expensive and frequent maintenance, i.e., bulb replacement, provide noticeably pinpoint light source and high operation cost.

Some conventionally lighted signs use bulbs to either form the word(s) or are arranged contiguously in alignment with the transparent word portions of the sign. Obviously, the letters in the sign in front of the bulbs appear much brighter than those portions spaced further from the bulb, the result being an inefficient, relatively expensive and esthetically unpleasant illuminated sign. In addition, the burnout of one or more such bulbs is typically noticeable by observers and information distortion may result.

These devices have numerous deficiencies such as being sumptuous in component parts, being cumbersome in design, requiring considerable maintenance, and subject to failure, and are relatively expensive and complex to manufacture.

PRIOR ART STATEMENT

In a number of prior art devices, such as described in U.S. Pat. Nos. 3,402,494 issued Sep. 24, 1968 to Raymond L. Gray; and 3,310,670 issued Mar. 21, 1967 to Ronald W. Sheppard; and 1,944,276 issued to Lindsey Schepmoes; the use of incandescent bulbs within an exit type sign is disclosed.

Another patent reference of interest is U.S. Pat. No. 3,309,806 issued Mar. 21, 1967 to R. S. Gallagher. This prior art "exit" sign uses a plurality of light bulbs arranged in rows and columns parallel with a diffusing plate and a lens plate. Although this device may present some advantages over the incandescent sign devices noted above, this type sign (design) is flawed in that such bulb arrangements can result in noticeable bulb burnout(s) and requires relatively numerous bulbs due to the light retarding effect of the diffusing plate.

Other prior art patents of interest include: U.S. Pat. Nos. 5,018,290 issued May 28, 1991 to Edward P. Kozek and Charles R. Ruskouski; 3,957,351 issued May 18, 1976 to Glade M. Stockwell; and 4,768,300 issued Sep. 6, 1988 to Renzo N. Rutili.

The above noted patents are mentioned as being representative of the prior art and other pertinent references may exist. None of these patents are deemed to affect the patentability of the present claimed invention.

In contrast to the prior art "exit" type signs typically used in buildings to meet local fire and building codes, the present invention provides a relatively low cost sign which uses low energy consuming LED's mounted on a printed circuit board and located at one or more sides of the housing to provide a source of relatively directional light which is then converted or reflected to simulate a diffused light source behind the transparent or translucent word portions of the sign.

SUMMARY OF THE INVENTION

An illuminated sign construction comprising: a housing having an open side wall, a sign cover plate having indicia and/or words demarcated/defined by translucent sections of plastic or glass or the like, a plurality of light emitting diodes mounted within said housing in back-of or posterior to the non-translucent or opaque portions of the sign cover plate, and a reflector plate or member for reflecting and diffusing the somewhat directional light being emitted by the LED's into a relatively diffused field of light illumination through the sign indicia to thereby present substantially uniformly illuminated sign indicia and/or words.

OBJECTIVES

Accordingly, it is an object of the present invention to provide a new and improved illuminated type sign.

Another object of the present invention is to provide a new and improved "exit" type sign.

Another object of the present invention is to provide a new and improved illuminated directional sign.

Another object of the present invention is to provide a sign apparatus that provides a substantially uniform field of illumination from a plurality of LED's offset within the sign apparatus.

Another object of the present invention is to provide an illuminated typed sign being relatively less expensive to manufacture.

Another object of the present invention is to provide a sign apparatus which is relatively less complex to manufacture.

Another object of the present invention is to provide a relatively light weight, durable, less energy consumptive and long lasting "exit" type sign for whatever sign symbols are desired.

Another object of the present invention is to provide an LED illuminated sign adapted to enable signs of different designations interchangeable without rearrangement or dislocation of the mounted LED light source.

Another object of the present invention is to provide a sign which uses substantially less energy to illumimate an "EXIT" type sign than currently available "EXIT" signs.

It is yet another object of the invention to provide a sign having a reflector and diffuser means for substantially converting the virtual unidirectional light emitted from LED's into a source of substantially diffused light radiating from the sign indicia.

The invention possesses other objects and features and advantages, which will be set forth in the detailed description of the preferred embodiments of the invention. It is to be understood, however, that variations of the illustrated embodiments may be achieved which are within the intended scope of the claimed invention.

BRIEF DESCRIPTION OF THE DRAWINGS

Throughout the drawings, like reference numerals refer to like parts.

DESCRIPTION OF THE PREFERRED EMBODIMENTS

Figure 1:
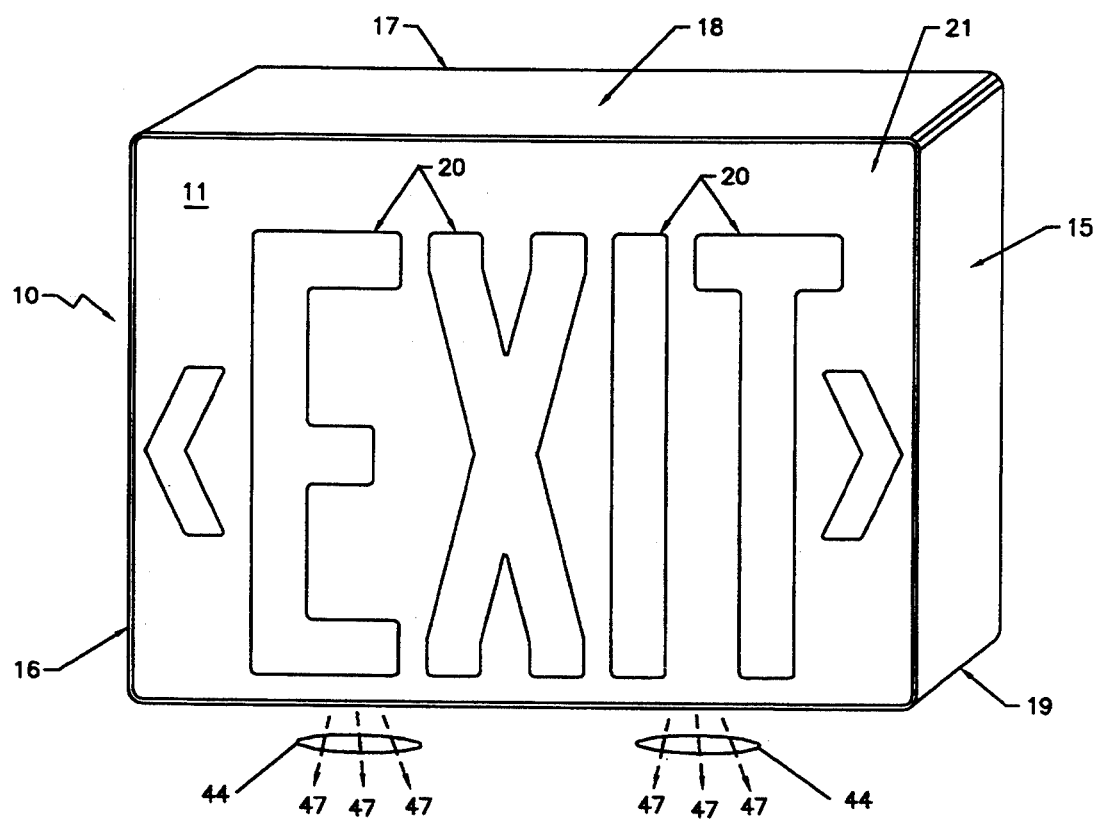
FIG. 1 is a perspective view of a sign embodying the present invention.
Figure 2:
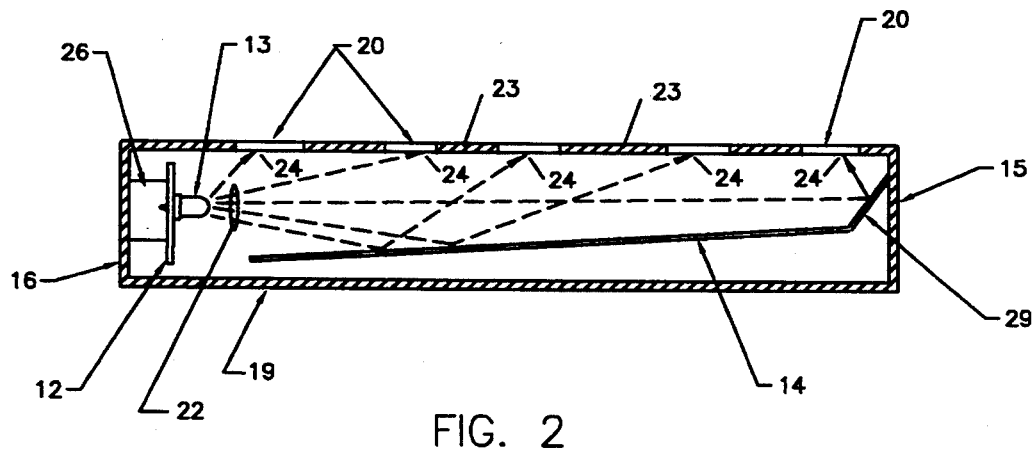
FIG. 2 is a cross sectional view of the sign illustrated in FIG. 1 showing the offset or offstaged LED printed circuit board and reflector assembly in accordance with the invention.

Referring to the drawings in which like numerals indicate like-parts, particularly FIGS. 1 and 2 there is shown an "exit" type sign constructed in accordance with the invention to have a simple assembly comprising a housing 10, a sign plate 11, a printed circuit board 12 (PC board) having a plurality of light emitting diode (LED) lights 13, and a reflector plate 14.

In general, the housing 10 has a pair of spaced side walls 15, 16, a back wall member 17, a top wall member 18, and a bottom wall member 19. The housing 10 may be formed of plastic, metal or other suitable material and being conventionally dimensioned for the selected use such as an "exit" sign used in buildings according to local code. Basically, such signs have a rectangular or box shape of a size to accommodate a display panel or cover plate 11 of desired dimensions. The enclosure or housing 10 has an open front wall portion being defined by wall portions 15, 16, 18 and 19. It will be appreciated that the structure as described thus far can be utilized to provide an illuminated display in a generally conventional manner whereby light passes through the translucent legend 20 and is blocked by the opaque or non-transparent portions 21 of cover plate 11, to illuminate and define, for example, the word "EXIT". The cover plate 11 may be formed of a flat sheet of translucent plastic and having a rectangular shape and dimensioned for being affixed to the housing 10 over the front open wall portion defined by walls 15, 16, 18, 19. The housing wall sections defining one or more holes 47 to enable one or more downwardly directed beams of light rays 44 to exit the housing.

In accordance with the present invention, a printed circuit board 12 with a plurality of light emitting diodes 13 mounted thereon is affixed/mounted in conventional manner to a side wall member 16 of housing 10. The PC board 12 may have an obtuse or acute angularity relative to the longitudinal axis of the enclosure. And a reflector member or plate 14 is mounted within housing 10 for reflecting the light output 22 from the LED's 13 unto the bottom surface 23 of cover plate 20 and through the transparent sections 24 of the indicia/legend 20.

The LED's 13 may be mounted onto the PC board 12 and electrically actuated/energized in conventional manner. Accordingly, an electrical diagram or schematic and LED bulb mounting fixture details are omitted to avoid prolixity. Basically speaking, however, the PC board 12 may be affixed to side wall member 16 of housing 10 by conventional nuts and bolts 26.

As is generally recognized, LED's 13 when energized produce a relatively narrow band 22 of somewhat directional light beams 25. It is this narrow band of directional light characteristic which prior to the present invention caused sign manufacturers to avoid their use in such signs.

Figure 7:
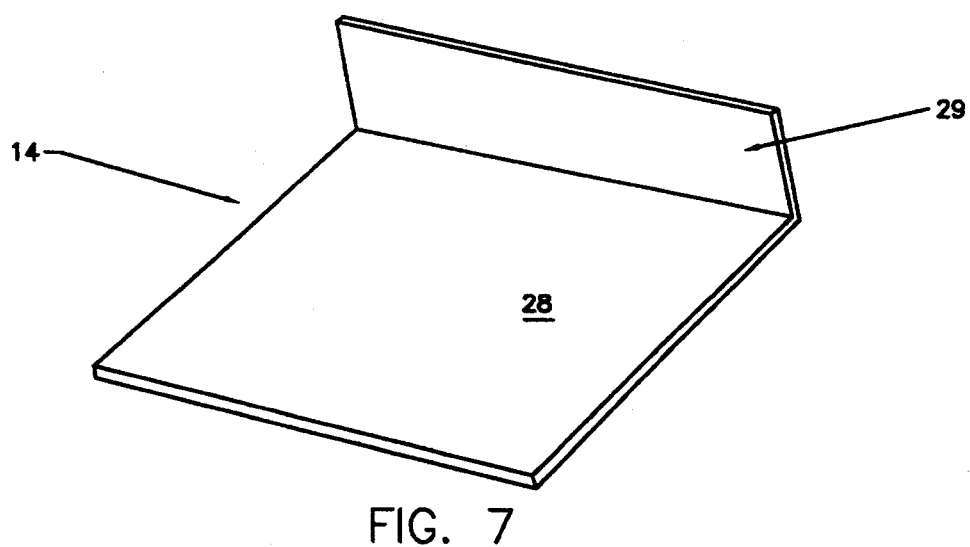
FIG. 7 is a perspective view of a reflector member having a specular or knurled reflective surface in accordance with the invention.

An important feature of the present invention is the provision of a reflector 14 mounted within housing 10. Reflector 14 may be formed of a polished metal or other suitable material to have a reflective surface 28. The reflective surface 28 may be smooth or specular or knurled or other suitable surface finish so as to reflect and diffuse the beams 22 of light 25 within housing 10 and, thereby, provide a diffused and uniform illumination through the transparent legend sections 20. In this manner, the benefits of a low energy consuming LED light source is converted into a substantially uniformly diffused/scattered light within the "EXIT" type sign. The reflector plate member 14 may be dimensioned to accommodate the size of the sign legend 20 so as to efficiently utilize the available beams of light 25 which may be substantially directed onto the reflector plate within housing 10. Reflector 14, as shown in FIGS. 2 and 7, may comprise a rectangular flat sheet of polished metal having an upturned or bent section 29 angled to reflect light rays upwardly onto the cover plate 11.

Figure 3:
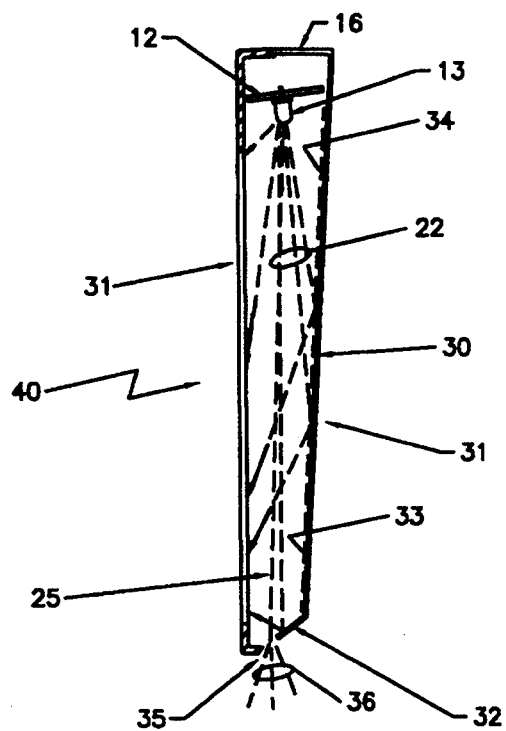
FIG. 3 is a cross sectional view of an alternative embodiment of a single sided sign in accordance with the invention.

Referring now to FIG. 3, a first alternative embodiment of the sign and reflector shown in FIG. 1 are illustrated. All other components and operations remain basically the same. The rear or bottom wall 30 of housing 31 comprises a square or rectangular shaped wall member 30 having a bent or inclined end portion 32 contoured for reflecting light rays 25 upwardly toward the legend cover plate 11. The inside of the bottom wall 30 is treated to yield a high reflectance specular or a polished knurled finished reflector 33. The specular or knurl reflective surface is illustrated by bumps 34. Since the technology for forming a reflective specular or knurl surface is within the prior art, a more detailed discussion of the method of forming such a surface 33, 34 on the housing bottom wall 30 is omitted to avoid prolixity. The end section 32 of the reflector back panel 30 may contain one or more holes 35 to enable light rays 36 to radiate without said housing end section 32. The holes 35 may be formed on the top end section 32 (see FIG. 3) and/or at the bottom 16 (see FIG. 1) of the sign 10, 40. In this manner partial lighting, i.e., down light through the holes 35 in the housing, may be provided in a relatively simple, inexpensive and efficient manner as compared to the prior art.

Figure 4:
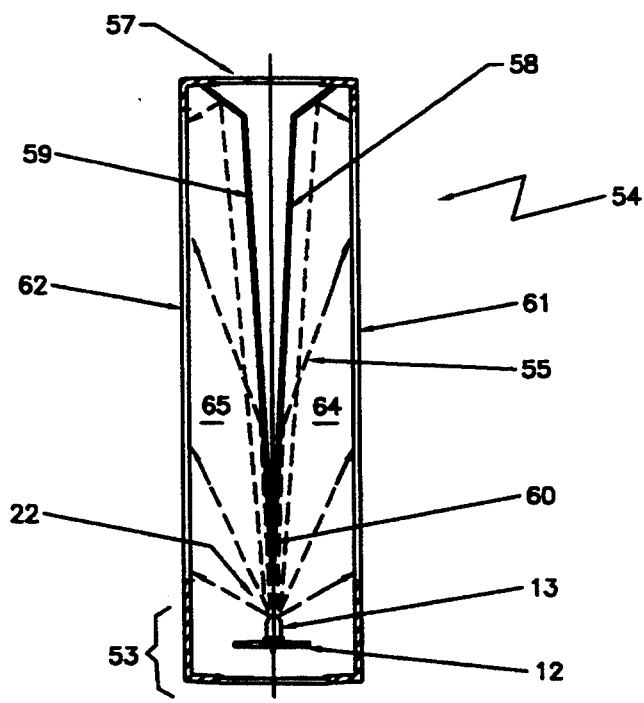
FIG. 4 is a cross sectional view of an alternative embodiment of the invention illustrating a double sided type sign.

Referring to FIG. 4, a second contemplated alternative embodiment of the "EXIT" type sign is depicted. The PC board 12 and row of LED lights 13 are mounted by conventional means (not shown) at the bottom end 53 of the double sided sign enclosure or housing 54. The PC board 12 and LED row of lights 13 are oriented relative to housing 54 such that a substantial portion of the light rays 55 and 56 radiate upwardly toward the top end 57 of housing 54. A pair of oppositely facing reflector plates 58, 59 are mounted above and aligned with the row of LED lights 13. The bottom ends 60 of reflector plates 58, 59 are abutted together to form a relatively thin edge for splitting or partitioning or separating the bundle of light rays 22 emitted from the LED lights 13. Reflector 58 is titled outwardly toward face plate or legend plate 61. Reflector 59 is tilted outwardly toward face (legend) plate 62. Each reflector 58, 59, has a mirror like surface or specular reflective surface to effect light diffusing and dispersing therewithin. In the embodiment illustrated in FIG. 4, the bundle of light rays 22 is divided into substantially two equal and diverging bundles of light rays 55, 56. Each of these diverging bundles of light rays 55, 56 are diffused and reflected by reflectors 58, 59, respectively. In this manner the reflected light rays 55, 56, generate a substantially uniform illumination within each sign side 64, 65, respectively. Thus, the sign legend or characters or letters (not shown) are substantially uniformly illuminated. It should be recognized that the reflectors or Baffles 14, 58, 59 are somewhat rectangularly shaped and slightly smaller in size than the housing.

Figure 5:
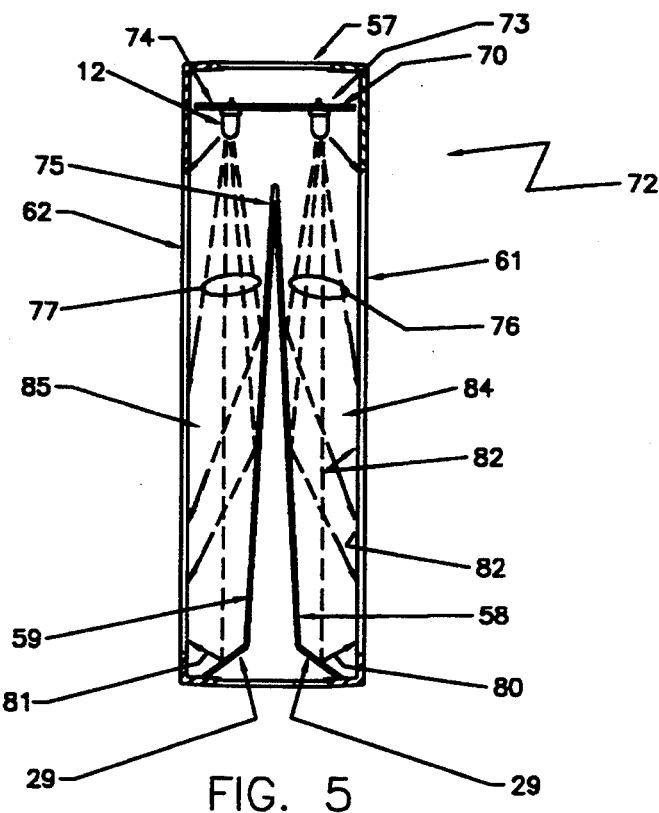
FIG. 5 is a cross sectional view of an alternative embodiment of the invention depicting a double sided sign.
Figure 6:
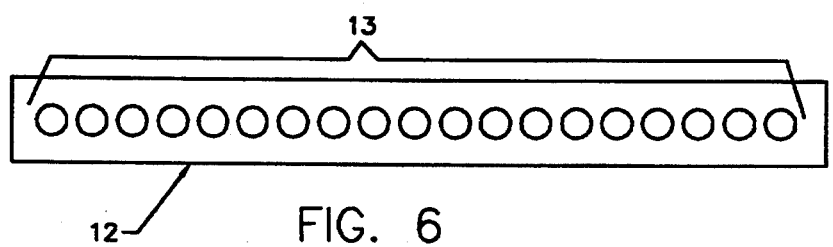
FIG. 6 is a front plan view illustrating a possible arrangement for mounting the LED's in accordance with the invention.

Referring now to FIG. 5, another alternative embodiment is illustrated. This embodiment features a double sided housing 54 having oppositely facing sign plates or legend panel 61, 62. An enlarged PC board 70 is mounted at the top end 57 of sign 72. Two spaced apart rows 73, 74, each containing a plurality of LED lights are mounted on PC board 70. The LED lights are directed downwardly within housing 54 by conventional means (not shown). The reflectors 58, 59 are joined or abutted together along their top edges 75 and diverge outwardly. In this manner, light rays 76 are diffused and reflected off reflector 58 to effect a substantially uniform illumination on legend plate 61. Light rays 77 are diffused and reflected off reflector 59 to effect a substantially uniform illumination on legend plate 62. Thus, reflector plates 58, 59 generally extend downwardly the full length of display sign 72 and have a bent end section 29 at its bottom. Bent end sections 29 are contoured to reflect emitted light rays 80, 81, into legend plates, 61, 62, respectively. The internal or back surfaces of the opaque area of legend plates 61, 62, respectively, are coated 82, 83 with a reflective coating to reflect the light rays striking the opaque regions to, thereby, enhance the uniformity of illumination within each separate chamber or side display panel 84, 85, respectively.

It should be recognized that the prior art LED "EXIT" signs use large printed circuit boards arranged parallel to the legend face plate and have many light bulbs which emit light rays directly unto the legend face plate. Such prior art signs have presented numerous disadvantages, such as, for example:

High cost for materials
Relatively high Energy Consumption
Down lights requires additional components
Relatively uneven illumination and spotted legend light effects
Defective bulbs resulting in noticeable sign defect IN TOTAL CONTRAST to the prior art "EXIT" type signs, the present invention provides a relatively small PC board module with LED's oriented to provide indirect illumination of the sign legends. The placement, size, orientation and other features of the present inventive sign provide the following benefits and improvements over the prior art signs.

1. Illumination board perpendicular to the face provides indirect even illumination to the legend (no hot spots).
2. A minimal amount of LED's are required therefore a minimum surface area of PC board material is required.
3. Down light (light through bottom of enclosure) is accomplished automatically and without the use of costly additional component.
4. With better performance and less components, a savings is also achieved in energy (power) consumption.
5. Because the illumination module is small, the enclosure can be smaller and therefore less costly to manufacture.

While there has been shown what is considered to be the preferred embodiment and several alternative embodiments of the invention, it is desired to secure in the appended claims all modifications as fall within the true spirit and scope of the invention.

What is claimed is:

1. A sign assembly comprising:
   a housing defining an enclosure therein and having a screen means with an opaque wall section and a translucent legend portion defining indicia;
   a printed circuit board mounted within said enclosure and arranged generally perpendicular to said screen means and generally at a side of said housing, said side adjoining said screen means;
   a plurality of light emitting diode lamp means mounted on said printed circuit board to radiate a bundle of substantially unidirectional light rays generally transversely across said enclosure to illuminate said enclosure; and
   a reflector means for diffusing and reflecting a portion of said bundle of light rays through a portion of said translucent legend portion of said screen means.

2. A sign assembly as in claim 1, wherein: the legend portion defines the word "EXIT".

3. A sign assembly as in claim 1, wherein: the legend portion defines a word.

4. A sign assembly as in claim 1, wherein: the legend portion defines a word.

5. A sign assembly as in claim 1, wherein: the opaque wall section being light reflective within said enclosure.

6. A sign assembly as in claim 1, wherein: the printed circuit board generally has an elongate rectangular configuration and having a normal angularity to said screen means.

7. A sign assembly as in claim 1, wherein: the reflector means (13) comprises a flat sheet material having a reflective surface (28) and being bent upwardly at one end portion (29).

8. A sign assembly as in claim 1, wherein: the legend portion of the screen means defines a perimeter dimension, and the reflector means has a size and configuration generally corresponding with said perimeter dimension.

9. A sign assembly as in claim 1, wherein: the reflector means being mounted at a predetermined angle relative to said screen means.

10. A sign assembly as in claim 1, wherein: the housing has a wall member having a reflective specular finish means for serving as a reflector (30, 32) for diffusing and reflecting a light beam (22) onto said screen means.

11. A sign assembly as in claim 1, including: a housing wall section defining a hole (47) to enable one or more down beams of light rays (44) to exit said housing, said hole being located in a generally opposite side of said housing relative to said printed circuit board and facing said printed circuit board to receive the unidirectional light rays therethrough.

12. A sign assembly in combination, comprising:
   a housing (10) having a pair of side walls, a pair of top and bottom walls and a rear wall (17) defining an enclosure therein and having a front open wall portion;

a cover plate (11) formed from a flat sheet of translucent plastic and dimensioned for being affixed to said housing over said front open wall portion, portions (21) of said cover plate being opaque, and said cover plate having translucent portions (20) to define the word "EXIT";

a printed circuit board means having a plurality of light emitting diodes mounted thereon and being mounted within said enclosure for providing a source of substantially unidirectional illumination (22, 76, 77), said printed circuit board means being mounted at a side end of said enclosure, said printed circuit board being generally perpendicular relative to said cover plate whereby said illuminating light rays (22) are radiated outwardly substantially parallel with said cover plate within said enclosure to illuminate said enclosure;

a reflector member (14) having a size and shape slightly smaller than said cover plate and having an upturned section (29), said reflector member being mounted within said enclosure with a general diagonal arrangement for reflecting and diffusing said parallel light rays (25) through said translucent portions of said cover plate.

13. An EXIT type sign assembly, comprising:

a housing (54) defining an enclosure (84, 85) and having a pair of spaced apart cover screen means, each having an opaque wall section and a translucent legend section (82, 83) for defining indicia on each said legend section thereby providing a sign on two sides of said housing;

a printed circuit board means having two separated rows each containing a plurality of light emitting diodes mounted thereon and being mounted within said enclosure for providing two rows of light rays (76, 77), said printed circuit board means being disposed at one end of said enclosure, said printed circuit board being substantially perpendicular to both said cover screen means such that two spaced apart substantially unidirectional beams of light rays (76, 77) are radiated transversely across said enclosure to illuminate said enclosure;

a pair of diverging reflector means (58, 59) each having a reflective surface and oppositely bent end members for diffusing and reflecting said light rays (76, 77) through a portion of each respective legend section.

* * * * *